Sept. 21, 1937.  S. W. THOMPSON  2,093,495
ENGINE CRANKSHAFT LINKAGE
Filed May 19, 1934  2 Sheets-Sheet 1

S. W. Thompson INVENTOR

BY

Thomas Howe ATTORNEY

Sept. 21, 1937.  S. W. THOMPSON  2,093,495
ENGINE CRANKSHAFT LINKAGE
Filed May 19, 1934   2 Sheets-Sheet 2

S. W. Thompson
INVENTOR
BY
Thomas Howe ATTORNEY

Patented Sept. 21, 1937

2,093,495

UNITED STATES PATENT OFFICE 2,093,495

ENGINE CRANKSHAFT LINKAGE

Seth Waldo Thompson, Essex Fells, N. J.

Application May 19, 1934, Serial No. 726,429

7 Claims. (Cl. 74—44)

This invention relates to linkage of shafts particularly the crank shafts of internal combustion engines, but it will be of use in other applications.

As is well known increasing the number of cylinders of an internal combustion engine increases its smoothness of running. There is a limit, however, to the number of cylinders which can be arranged in a straight line various reasons among which may be mentioned the limitation of the available length of engine in an automobile or other location and also, with air cooled engines, the difficulty of cooling the rear cylinders. To shorten up the engine, the V-type has been proposed, which, as is well known, comprises two rows of inclined cylinders connected with the one shaft. The V-type engine, however, encounters disadvantages of unequal wear and difficulties of lubrication which are not present in the engine with vertical cylinders. In order to shorten the engine and secure the advantages of the vertical cylinders, the cylinders may be arranged in a plurality of parallel rows, each row having its own crank shaft. It is necessary, however, in order to have all of the engine cylinders functionally cooperate as a whole that the shafts should be connected together so as to hold them in proper synchronous relation and provide for the cooperation of the cylinders of the engine to supply power to the propeller shaft or other driven mechanism. It has been proposed to connect the crank shafts by gearing, but such connection is noisy in operation and is inefficient as a power transmitter.

It is the main object of the present invention to provide a connection between shafts by means of a link as distinguished from toothed gearing, whereby the noise and inefficiency of the toothed gearing is avoided and which linkage shall be so arranged and constructed that the mechanism shall be smooth and noiseless in its operation at all times and particularly free from any jamming or jarring which is likely to occur at the dead centers of two shafts having their throws connected together by a link. By the term "throw" is intended to be designated a crank, eccentric or other similar device.

The invention is realized by connecting together by linkage, the throws on not less than three shafts, the power being applied to one or more of the shafts and power may be taken from one or more of the shafts. The relative operation of the throws, on three or more shafts, on the linkage, and their interaction, will insure smooth operation of the engine and avoid any dislocation or jarring particularly at dead centers as would be likely to take place if two throws only were connected together by a link.

Where there are three or more power shafts the benefits of the invention may be realized by linking throws on the power shafts, but if there are but two power shafts a third or dummy shaft may be supplied and the linkage connect throws on the two power shafts and the dummy shaft.

Other and ancillary objects of the invention will appear hereinafter.

In the accompanying drawings which illustrate the invention—

Figure 1:
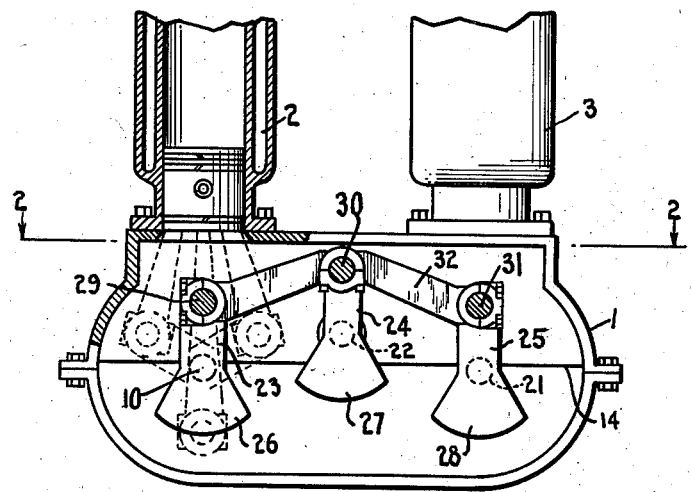
Fig. 1 is a vertical section on the line 1—1 of Fig. 2, of an internal combustion engine embodying the invention, the upper portion of the engine being broken away and certain of the parts being omitted for clearness, the upper portion of the crank case and one cylinder being broken away to show them in vertical section.
Figure 2:
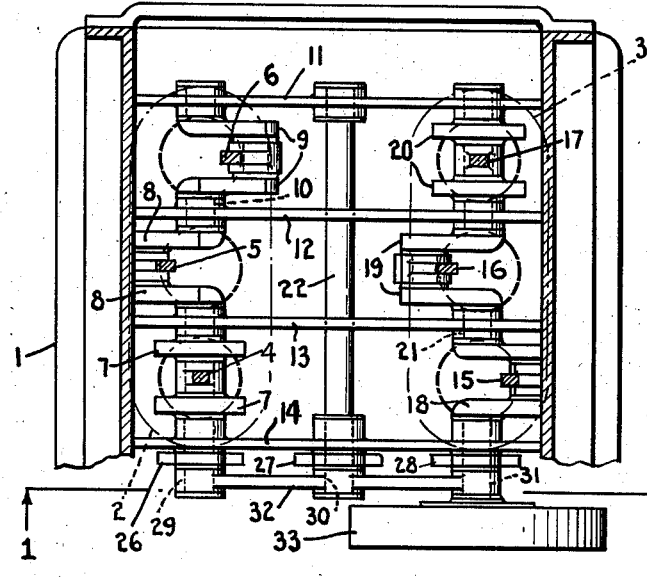
Fig. 2 is a section on the line 2—2 of Fig. 1.
Figure 3:
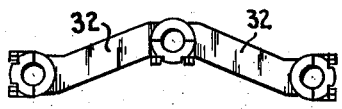
Fig. 3 is a side elevation of the link for connecting the crank throws.

Referring to the drawings, and first to Figs. 1 to 3 inclusive, the six cylinder internal combustion engine therein shown comprises the crank case 1 on which are mounted the two rows of parallel cylinders, one including the three cylinders 2, and the other the three cylinders 3, provided with suitable ignition and timing means, valve mechanism, fuel supply and exhaust in a manner as is well understood in connection with internal combustion engines and need not be further referred to.

The pistons in the cylinders 2 are respectively connected by piston rods 4, 5 and 6 with the throws, that is the throws or cranks, 7, 8 and 9 of the crank shaft 10 journaled in the webs 11, 12, 13 and 14 secured to the crank case. Similarly the piston rods 15, 16 and 17 of the cylinders 3 respectively, are connected with the throws or cranks 18, 19 and 20 of the crank shaft 21 journaled in the webs 11, 12, 13 and 14. It will be seen that the axes of the crank shafts 10 and 21 are parallel, and parallel with them, but out of line therewith, is a third shaft 22 journaled in the webs 11, 12, 13 and 14. The shaft 22, it will be seen, is what may be characterized as a "dummy" shaft in that it is not a crank shaft and may serve neither to receive nor deliver power although power may be taken from this shaft if desired.

Fixed upon the shafts 10, 22 and 21 respectively are the crank arms or throws 23, 24 and 25 which may be suitably counterweighted by weights 26, 27 and 28, the crank arms having respectively crank pins 29, 30 and 31 rotatably mounted in the rigid integral link 32. It will be noted that the cranks 23, 24 and 25 are of the same length and as so linked together are parallel and all turn together, the link 32 describing a circular movement and maintaining all of its positions parallel at all times. The flywheel 33 may be fixed upon any or all of the shafts 10, 22 or 21, in this instance a flywheel 33 being shown fixed upon the shaft 21.

With this arrangement of supplying the third shaft (in this case a "dummy"), the connection between the crank shafts 10 and 21 is obtained by means of a link instead of the inefficient and noisy toothed gearing, and at the same time smooth running of the engine as a whole without jars or dislocation, especially at dead centers, is avoided.

Figure 4:
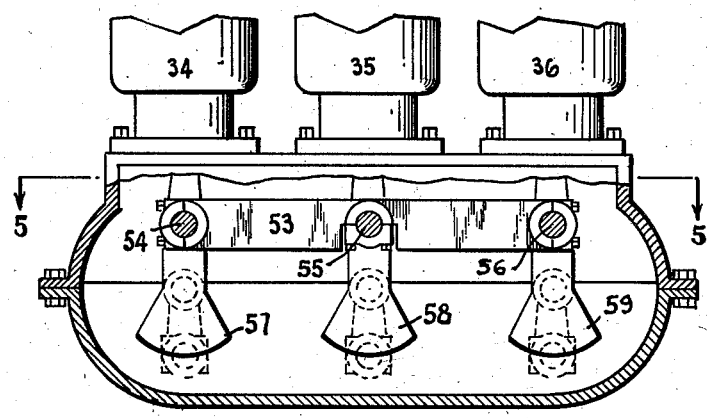
Fig. 4 is a partial section on the line 4—4 of Fig. 5 of an internal combustion engine having a different arrangement of cylinders and form of throw linkage, the upper portion of the engine being shown in end elevation and partly broken away.
Figure 5:
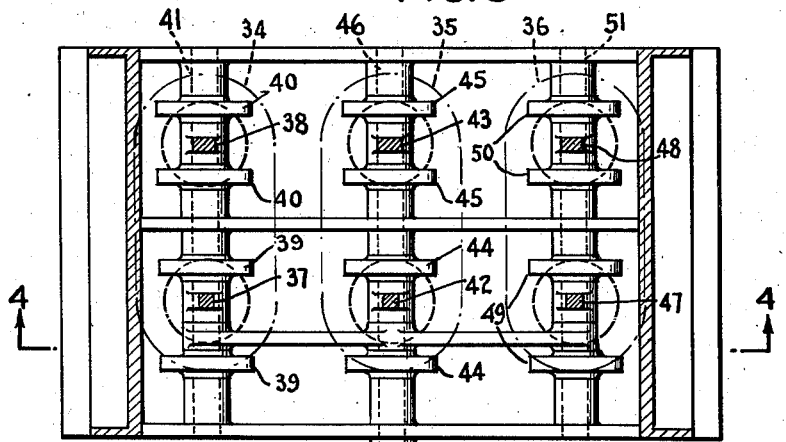
Fig. 5 is a section on the line 5—5 of Fig. 4.

Referring to Figs. 4 and 5 there is therein shown an arrangement whereby the six cylinder engine has its cylinders arranged in three parallel rows of two each whereby the cooling of the cylinders, especially air cooling, may be more efficiently accomplished by having two cylinders in a row rather than more. Also in this modified engine embodying the invention, the three rows of cylinders having three crank shafts, the addition of a dummy shaft is unnecessary but the three crank shafts provide the necessary three shafts to realize the advantages of the invention. Also the three linked shafts are shown as being in line and the connecting link is straight. Thus the structure of Figs. 4 and 5 comprises the three rows of cylinders comprising respectively the two cylinders 34, 35 and 36 of each row. The cylinders 34 of one row have the piston rods 37 and 38 connected with the throws or cranks 39 and 40 on the crank shaft 41, the pistons of the two cylinders 35 are respectively connected by the piston rods 42 and 43 with the throws 44 and 45 on the crank shaft 46 and the pistons of the two cylinders 36 are respectively connected by the piston rods 47 and 48 with the throws 49 and 50 upon the crank shaft 51. Also fixed upon the crank shaft 46 is a flywheel 52.

Mounted upon the cranks 39, 44 and 49 is a straight integral link 53 which is journaled upon the crank pins 54, 55 and 56 of the throws respectively, the crank pins being made long enough so that the link 53 may be placed on them alongside the piston rods. In this way additional cranks for the link are made unnecessary, the link using the piston rod throws. The link may be counterbalanced by weights 57, 58 and 59. With the three shafts linked together as described, smooth running of the engine and freedom from shocks or dislocation of the parts at any time is assured.

Figure 6:
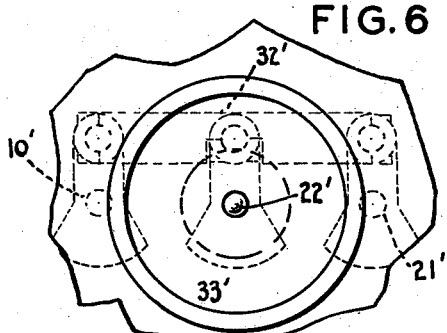
Fig. 6 is a fragmentary view, the same being an end elevation, of a portion of an engine showing the crank shaft arrangement with a modified form of linkage.
Figure 7:
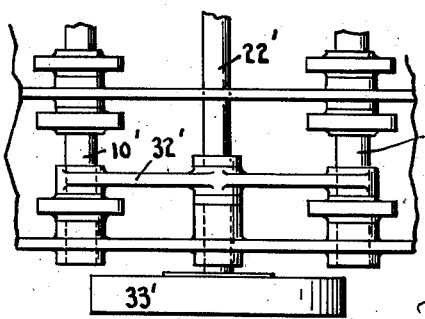
Fig. 7 is a top plan view of the apparatus of Fig. 6.

Referring to Figs. 6 and 7, there is therein shown a slight modification of the structure of Figs. 1 to 3 inclusive, wherein the dummy shaft 22' has its axis in line with the axes of the crank shafts 10' and 21' and has the flywheel 33' mounted upon it. Also the connecting link 32' between the shafts is shown as straight.

While the invention has been illustrated in what are considered its best applications it may have other embodiments without departing from its spirit and is not therefore limited to the structures shown in the drawings.

What I claim is:

1. The combination with three or more parallel shafts, of a throw on each of said shafts, linkage connecting the throws of said shafts, a throw on each of said shafts being journaled in one link and means for applying power to a plurality of said shafts independently of said linkage.

2. The combination with three or more parallel shafts, said shafts being out of line, of a throw on each of said shafts, a throw on each of said shafts being journaled in one link, linkage connecting the throws of said shafts and means for applying power to a plurality of said shafts independently of said linkage.

3. The combination with three parallel shafts, of a throw on each of said shafts, linkage connecting the said throws of said shafts, a throw on each of said shafts being journaled in one link and means for applying power to each of two of said shafts independently of said linkage.

4. The combination with three parallel shafts, of a throw on each of said shafts, linkage connecting the said throws of said shafts, a throw on each of said shafts being journaled in one link and means for applying power to each of said three shafts independently of said linkage.

5. In an internal combustion engine, the combination with a plurality of rows of cylinders, a plurality of crank shafts parallel to each other, there being one crank shaft for each of said rows of cylinders, and each of said shafts having a throw, pistons in said cylinders, driving connections between the pistons of each row of cylinders and its corresponding crank shaft, an additional shaft having a throw and a rigid link connecting throws on said crank shafts and on said additional shaft.

6. An internal combustion engine comprising in combination three or more rows of cylinders, each row comprising a plurality of cylinders, a plurality of parallel crank shafts one corresponding to each of said rows of cylinders and having throws, pistons in said cylinders, means for connecting the pistons of each row with their respective throws on their respective crank shafts and a rigid link connecting throws on all of said crank shafts.

7. An internal combustion engine comprising in combination three or more parallel crank shafts, cylinders, pistons in said cylinders and means for operatively connecting said pistons with said crank shafts, said crank shafts having throws and a rigid link connecting throws on all of said shafts, said pistons being connected with said shafts independently of said link.

SETH WALDO THOMPSON.